United States Patent
Seo et al.

(10) Patent No.: US 8,059,094 B2
(45) Date of Patent: Nov. 15, 2011

(54) APPARATUS AND METHOD FOR NAVIGATION IN THREE-DIMENSIONAL GRAPHICAL USER INTERFACE

(75) Inventors: Young-wan Seo, Suwon-si (KR); Min-chul Kim, Seoul (KR); Eun-jung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 899 days.

(21) Appl. No.: 11/648,666

(22) Filed: Jan. 3, 2007

(65) Prior Publication Data

US 2007/0159464 A1 Jul. 12, 2007

(30) Foreign Application Priority Data

Jan. 6, 2006 (KR) .................. 10-2006-0001694

(51) Int. Cl.
    G09G 5/08 (2006.01)
(52) U.S. Cl. ........ 345/167; 345/156; 345/157; 345/158; 345/159; 345/160; 345/161; 345/162; 345/163; 345/164; 345/165; 345/166
(58) Field of Classification Search .................. 345/419, 345/156–167
    See application file for complete search history.

(56) References Cited

U.S. PATENT DOCUMENTS

| | | | | |
|---|---|---|---|---|
| 5,561,445 A | * | 10/1996 | Miwa et al. ................. | 345/163 |
| 5,850,213 A | * | 12/1998 | Imai et al. .................. | 428/1.55 |
| 6,097,372 A | | 8/2000 | Suzuki | |
| 6,300,938 B1 | * | 10/2001 | Culver ........................ | 345/156 |
| 2003/0076304 A1 | | 4/2003 | Smyth | |
| 2004/0160414 A1 | | 8/2004 | Armstrong | |
| 2004/0164957 A1 | * | 8/2004 | Yamaguchi et al. ......... | 345/156 |
| 2005/0179663 A1 | * | 8/2005 | Ludwig ....................... | 345/167 |

FOREIGN PATENT DOCUMENTS

| | | |
|---|---|---|
| CN | 1676186 A | 10/2005 |
| JP | 61068629 A | 4/1986 |
| JP | 61211726 A | 9/1986 |
| JP | 6424456 U | 2/1989 |
| JP | 05040571 A | 2/1993 |
| JP | 05173705 A | 7/1993 |
| JP | 6-89139 A | 3/1994 |
| JP | 06059811 A | 3/1994 |
| JP | 07049743 A | 2/1995 |
| JP | 9-69025 A | 3/1997 |
| JP | 09073366 A | 3/1997 |
| JP | 09288541 A | 11/1997 |
| JP | 9-319514 A | 12/1997 |
| JP | 11282620 A | 10/1999 |
| JP | 2000-105667 A | 4/2000 |

(Continued)

*Primary Examiner* — Richard Hjerpe
*Assistant Examiner* — Saifeldin Elnafia
(74) *Attorney, Agent, or Firm* — Sughrue Mion, PLLC (57) ABSTRACT

A navigation apparatus and method for a three-dimensional graphical user interface are provided. The apparatus includes an input unit that has a plurality of trackballs, in a space containing a certain plane and an-axis crossing the plane at a right angle, for navigation in a direction of the plane and the-axis, a detecting unit that detects a combination of the plurality of trackball movements and generates an input signal, a mapping table that defines the relationship between the input signal and the command for the navigation, and a graphics object control unit that performs the navigation corresponding to the input signal.

29 Claims, 9 Drawing Sheets

FOREIGN PATENT DOCUMENTS

| | | |
|---|---|---|
| JP | 2000330722 A | 11/2000 |
| JP | 2001331274 A | 11/2001 |
| JP | 2003-005905 A | 1/2003 |
| JP | 2004-164409 A | 6/2004 |
| KR | 10-2001-0091856 A | 10/2001 |
| KR | 10-2002-0011714 A | 2/2002 |
| KR | 10-2003-0035411 A | 5/2003 |
| KR | 10-2005-0035930 A | 4/2005 |

* cited by examiner

| FIRST TRACKBALL | SECOND TRACKBALL | THIRD TRACKBALL | FOURTH TRACKBALL | OPERATION |
|---|---|---|---|---|
| ✓ | . | . | . | MOVE TO (-)X-AXIS |
| . | ✓ | . | . | MOVE TO (+)X-AXIS |
| . | . | ✓ | . | MOVE TO (+)Y-AXIS |
| . | . | . | ✓ | MOVE TO (-)Y-AXIS |
| → | → | . | . | ROTATE AROUND Y-AXIS COUNTERCLOCKWISE |
| ← | ← | . | . | ROTATE AROUND Y-AXIS CLOCKWISE |
| . | . | ↓ | ↓ | ROTATE AROUND X-AXIS COUNTERCLOCKWISE |
| . | . | ↑ | ↑ | ROTATE AROUND X-AXIS CLOCKWISE |
| ↑ | ↓ | → | . | ROTATE AROUND Z-AXIS CLOCKWISE |
| ↓ | ↑ | ← | . | ROTATE AROUND Z-AXIS COUNTERCLOCKWISE |
| ⋮ | ⋮ | ⋮ | ⋮ | |

✓ : CLICK

→ : ROTATION DIRECTION

FIG. 4B

| FIRST TRACKBALL | SECOND TRACKBALL | THIRD TRACKBALL | FOURTH TRACKBALL | OPERATION |
|---|---|---|---|---|
| ✓ | | | | FOCUS GRAPHIC OBJECT ON A DIRECTION OF (−)X-AXIS |
| | ✓ | | | FOCUS GRAPHIC OBJECT ON A DIRECTION OF (+)X-AXIS |
| | | ✓ | | FOCUS GRAPHIC OBJECT ON A DIRECTION OF (+)Y-AXIS |
| | | | ✓ | FOCUS GRAPHIC OBJECT ON A DIRECTION OF (−)Y-AXIS |
| → | → | | | FOCUS A PLURALITY OF GRAPHIC OBJECTS IN A DIRECTION OF (+)X-AXIS |
| ← | ← | | | FOCUS A PLURALITY OF GRAPHIC OBJECTS IN A DIRECTION OF (−)X-AXIS |
| | | ↓ | ↓ | FOCUS A PLURALITY OF GRAPHIC OBJECTS IN A DIRECTION OF (−)Y-AXIS |
| | | ↑ | ↑ | FOCUS A PLURALITY OF GRAPHIC OBJECTS IN A DIRECTION OF (+)Y-AXIS |
| ↑↓ | ↓↑ | → | | ZOOM IN |
| ↓↑ | ↑↓ | ← | | ZOOM OUT |
| ⋮ | ⋮ | ⋮ | ⋮ | |

✓ : CLICK

→ : ROTATION DIRECTION

FIG. 5A

✓ : CLICK

→ : ROTATION DIRECTION

FIG. 5B

✓ : CLICK

→ : ROTATION DIRECTION

FIG. 6A

✓ : CLICK

→ : ROTATION DIRECTION

APPARATUS AND METHOD FOR NAVIGATION IN THREE-DIMENSIONAL GRAPHICAL USER INTERFACE

CROSS-REFERENCE TO RELATED APPLICATION

This application claims priority from Korean Patent Application No. 10-2006-0001694 filed on Jan. 6, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to navigation, and more particularly, navigation using a three-dimensional graphical user interface.

2. Description of the Related Art

In digital devices, graphical user interfaces (hereinafter, referred to as "GUIs") are used to provide an easy and efficient way to use the digital device and information. A user usually moves a pointer using an input unit such as a keypad, keyboard or a mouse, and can command a digital device to perform a desired operation by selecting a graphics object indicated by the pointer.

GUIs are typically divided into a two-dimensional GUI and a three-dimensional GUI. The two-dimensional GUI is planar and static, while the three-dimensional GUI is cubic and dynamic compared to the two-dimensional GUI. Therefore, the three-dimensional GUI is a more attractive interface. Accordingly, the three-dimensional GUI is slowly replacing the two-dimensional GUI.

Although the three-dimensional GUI is replacing the two-dimensional GUI, an input unit such as one having four direction keys and a joystick of conventional digital devices still has a function for navigating only the two-dimensional GUI.

Accordingly, a problem occurs when a user navigates a three-dimensional graphical user interface using a two-dimensional input unit. Additionally, only limited three-dimensional GUIs for two-dimensional devices have been provided.

It is difficult to navigate three-dimensional GUIs using the conventional input units. Several inventions (for example, Korean Unexamined Patent No. 2004-009013: "Ball-Type Direction Indicator for Mobile Phone) have been disclosed. However, the above-described problem still remains to be solved.

Thus, an input unit and a three-dimensional GUI that can overcome the inconveniences of three-dimensional GUI navigation are needed.

SUMMARY OF THE INVENTION

In view of the above, it is an aspect of the present invention to provide a navigation apparatus and method for overcoming the inconveniences in navigating three-dimensional graphical user interface and for developing various three-dimensional graphical user interfaces.

This and other aspects, features and advantages, of the present invention will become clear to those skilled in the art upon review of the following description, attached drawings and appended claims.

According to an aspect of the present invention, there is provided a navigation apparatus for a three-dimensional graphical user interface, the navigation apparatus including an input unit that has a plurality of trackballs, in a space containing a certain plane and an-axis crossing the plane at right angle, for navigation in a direction of the plane and the-axis; a detecting unit that detects a combination of the plurality of trackball movements and generates an input signal; a mapping table that defines the relationship between the input signal and the navigation command; and a graphics object control unit that performs the navigation corresponding to the input signal.

According to another aspect of the present invention, there is provided a navigation method for a three-dimensional graphical user interface, the navigation method including receiving an input signal, in a space containing a certain plane and an-axis crossing the plane at a right angle, for navigation in a direction of the plane and the-axis; and performing the navigation corresponding to the input signal by referring to a mapping table that defines the relationship between the input signal and the command for the navigation, wherein the input signal is generated according to a combination of the plurality of trackball movements.

BRIEF DESCRIPTION OF THE DRAWINGS

The above and other features and advantages of the present invention will become apparent by describing in detail exemplary embodiments thereof with reference to the attached drawings, in which.

DETAILED DESCRIPTION OF THE EXEMPLARY EMBODIMENT OF THE INVENTION

Advantages and features of the aspects of the present invention and methods of accomplishing the same may be understood more readily by reference to the following detailed description of exemplary embodiments and the accompanying drawings. However, aspects of the present invention may be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The present invention is described hereinafter with reference to a block diagram or flowchart illustrations of an access point and a method for transmitting MIH protocol information according to exemplary embodiments of the invention. It should be understood that each block of the flowchart, and combinations of blocks in the flowchart can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus creates ways for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded into a computer or other programmable data processing apparatus to cause a series of operations to be performed on the computer or other programmable apparatus to produce a computer implemented process such that the instructions executed in the computer or other programmable apparatus provide operations for implementing the functions specified in the flowchart block or blocks.

And each block of the flowchart illustrations may represent a module, segment, or portion of code which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

First, a three-dimensional graphical user interface will be briefly described before explaining a navigation apparatus and method for a three-dimensional graphical user interface according to an exemplary embodiment of the present invention.

Figure 1:
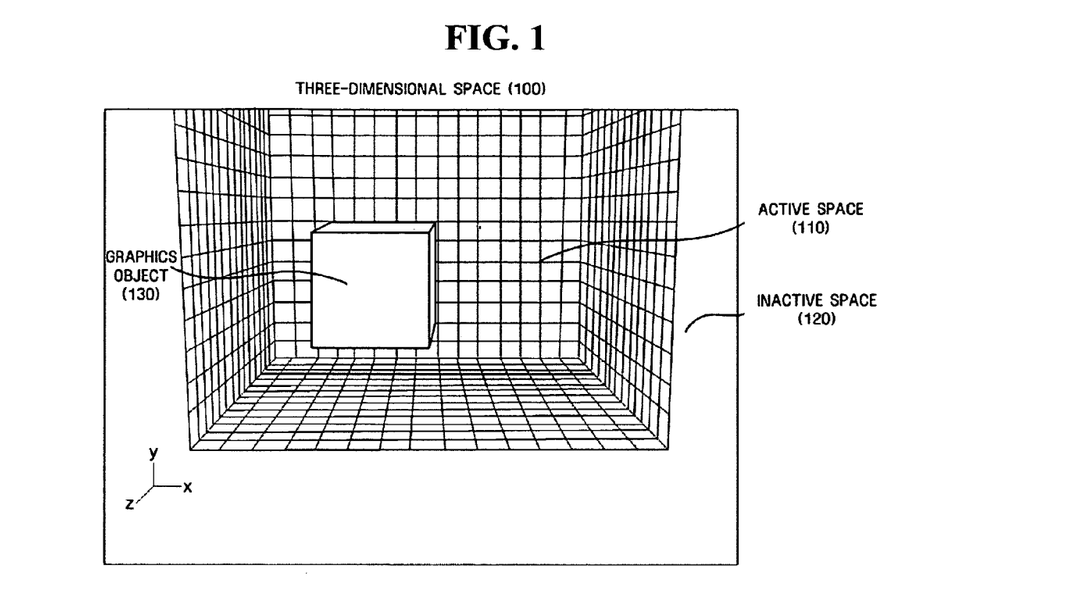
FIG. 1 depicts an entire configuration of three-dimensional graphical user interface applied to an exemplary embodiment of the present invention.

FIG. 1 depicts an entire configuration of a three-dimensional graphical user interface applied to an exemplary embodiment of the present invention.

The three-dimensional GUI is a UI concept of constructing a more dynamic GUI environment based on a three-dimensional environment and motion graphics. The three-dimensional GUI environment consists of:

1. A Three-Dimensional Space
2. Graphics objects
3. A Camera View
4. A Graphics Object Presentation Method A three-dimensional space 100, as an area for constructing the three-dimensional environment, may be divided into an active space 110 and an inactive space 120. The active space 110 may be used when UI is designed.

A graphics object 130 provides information, along with performing interaction with a user. The graphics object 130 may include at least one of the information planes. The information plane, which shows information for a user, may transmit information on controllable menu items or each sub-item. The information plane may display a two-dimensional widget such as text, images, movie and others. Cubic information such as a three-dimensional icon may be displayed on the information plane.

The graphics object may be represented as a polyhedric solid figure such as a hexagonal pillar, a square pillar, a trigonal prism, and a cylinder. It seems that a sphere is a polyhedric solid figure including a number of planes. A polyhedric graphics object has attributes, such as an identifier and a size, and numbers, colors, a transparency, an information plane, and so on, as an attribute for a plane, but the polyhedric graphics object is not limited thereto.

The graphics object 130 may generate a proper motion in a three-dimensional space. For example, the graphics object 130 may rotate around a critical-axis, a critical angle, and direction. The graphics object 130 may also generate a motion such as a position movement, or a size enlargement or reduction.

A camera view is a view point in a three-dimensional space. The camera view may be moved in a three-dimensional space. The movement of the camera view means that navigation is performed in the space, accordingly, motions occur in entire space. With a proper motion attribute of a graphics object, the camera view is the main cause of motion in a three-dimensional graphical user interface.

A graphics object presentation determines how one or more graphics objects are controlled as a group, what operation is performed in a controlling process, and how the graphics objects are arranged. The graphics object may be arranged on the z-axis or a plurality of graphics objects may be overlapped.

Figure 2:
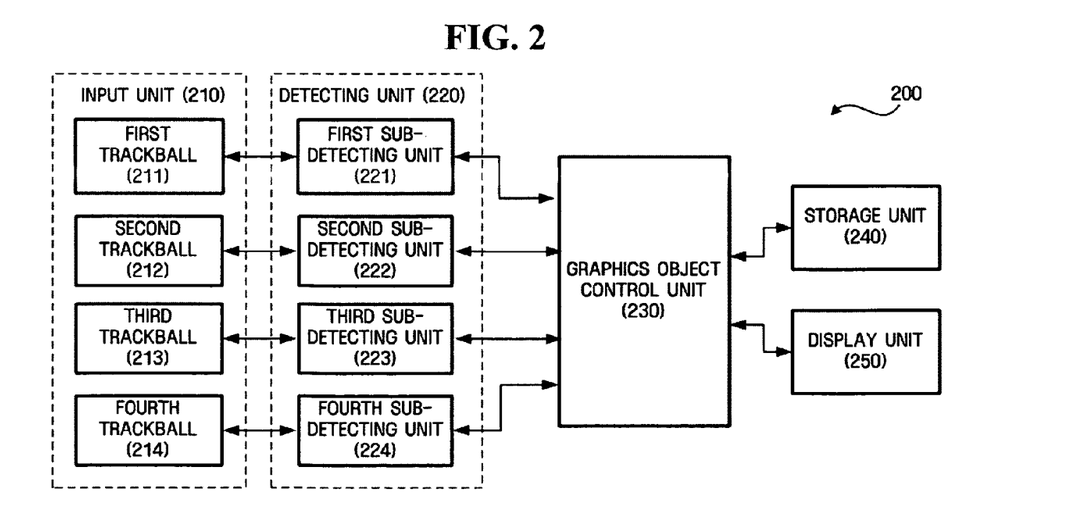
FIG. 2 is a block diagram illustrating a configuration of a navigation apparatus according to a first exemplary embodiment of the present invention.
Figure 3:
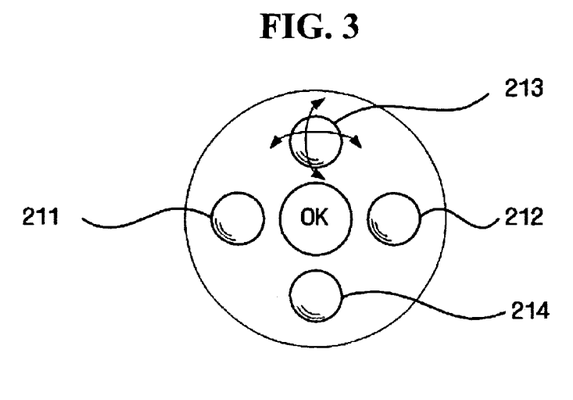
FIG. 3 illustrates an input unit of the navigation apparatus illustrated in FIG. 2.
Figure 4A:
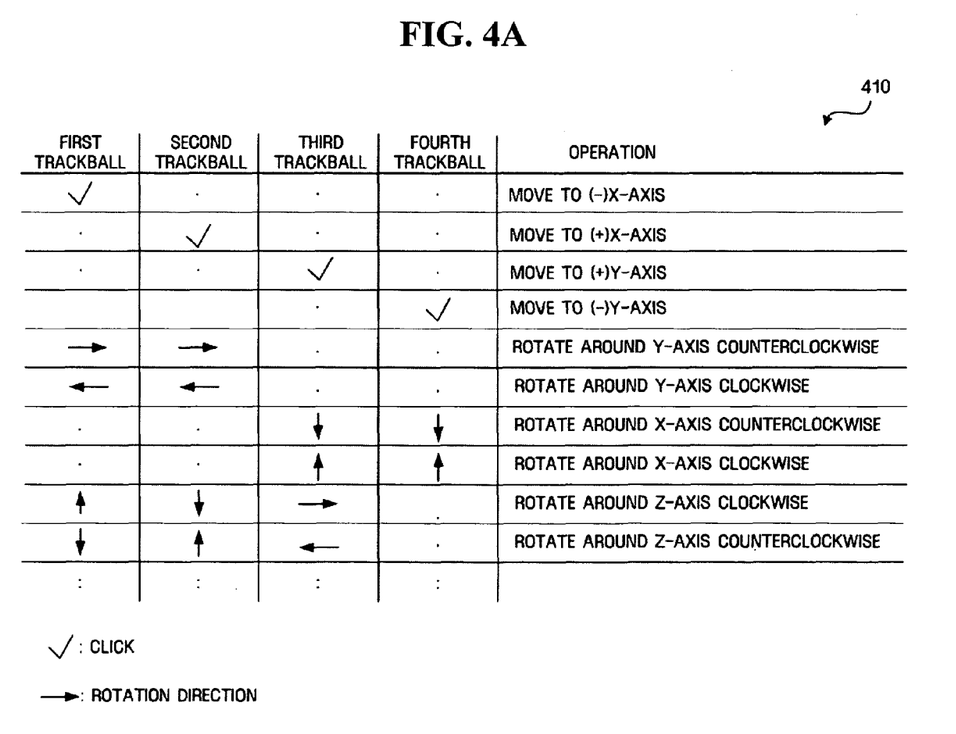
FIGS. 4A and 4B illustrate several exemplary embodiments of a mapping table.
Figure 4B:
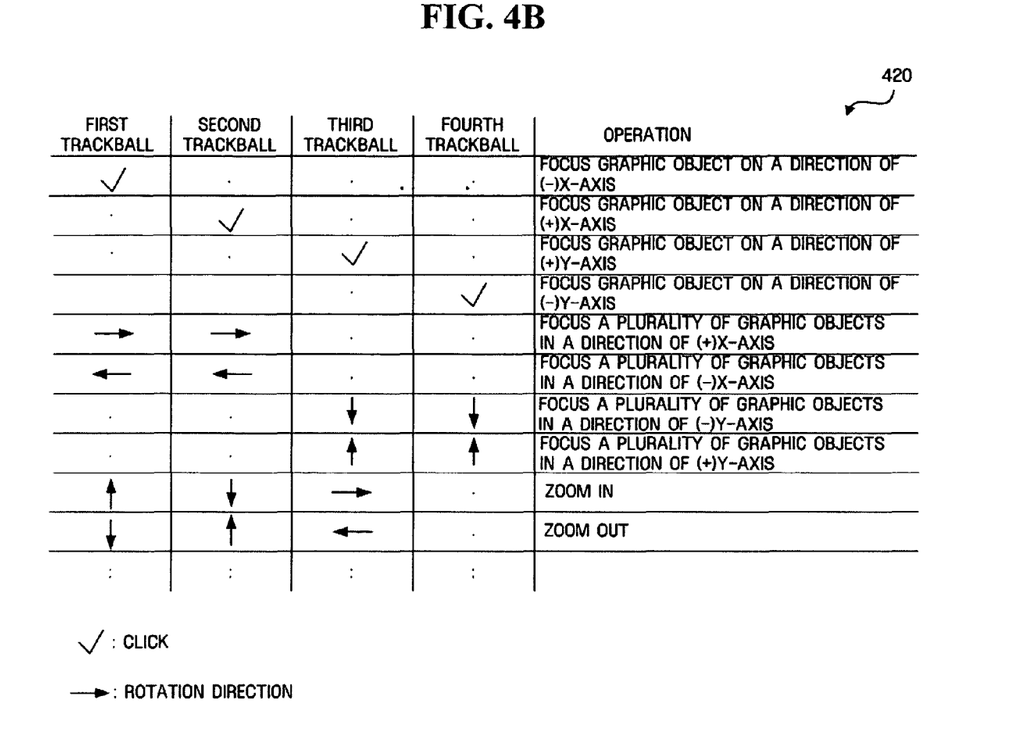

A navigation apparatus using a three-dimensional graphical user interface (hereinafter, referred to as "navigation apparatus") will be described in FIGS. 2 through 4B. FIG. 2 is a block diagram illustrating a configuration of a navigation apparatus according to a first exemplary embodiment of the present invention. FIG. 3 illustrates an input unit of the navigation apparatus illustrated in FIG. 2. FIGS. 4A and 4B illustrate several exemplary embodiments of a mapping table.

A navigation apparatus 200 from an exemplary embodiment of the present invention may be embodied as a digital device. The digital device is a device having a digital circuit that processes digital data, e.g., a computer, a printer, a scanner, a pager, a digital camera, a facsimile, a digital copier, a digital home appliance, a digital telephone, a digital projector, a home server, a digital video recorder, a digital broadcast receiver, a digital satellite broadcast receiver, a set-top box, a personal digital assistant (PDA), and a cellular phone.

Specifically, the navigation apparatus 200, as illustrated in FIG. 2, includes an input unit 210, a detecting unit 220, a storage unit 240, a graphics object control unit 230 and a display unit 250.

The input unit 210, which receives an input value by a user, includes a plurality of function key, e.g., a power key (not shown) for the navigation apparatus 200 and a running key that performs a user's command. When the keys included in the input unit 210 are input by a user, the input unit 210 creates a certain key signal and the generated key signal is provided to the graphics object control unit 230.

The input unit 210 includes a plurality of clickable and rotatable trackballs 211, 212, 213 and 214. The number of trackballs may be different according to the type of embodiment, but it is preferable, but not necessary, that the input unit 210 includes four trackballs (211, 212, 213, and 214) and that each trackball is arranged in the x-y plane corresponding to each direction of left, right, up, and down. FIG. 3 illustrates an input unit 210 according to an exemplary embodiment of the present invention. FIG. 3 shows that the input unit 210 includes first, second, third, and fourth trackballs 211, 212, 213, and 214, and that each trackball is arranged corresponding to a left, right, up, and down direction as a crisscross pattern. Of the arranged track balls, the left and right trackballs 211 and 212 correspond to the x-axis direction and the up and down trackballs 211 and 212 correspond to a direction of the y-axis. As an exemplary embodiment, it will be described that the first, second, third, and fourth trackballs (211, 212, 213, and 214) are respectively arranged in left, right, up, and down directions.

The detecting unit 220 detects a click and rotation of the trackballs included in the input unit 210. Preferably, but not necessary, the detecting unit 220 corresponds one-to-one with the trackballs 211, 212, 213, and 214. For example, when the input unit 210 includes first, second, third, and fourth trackballs, the detecting unit 220 includes first, second, third, and fourth sub-detecting units 221, 222, 223, and 224. If the trackballs are clicked, the detecting unit 220 generates a click signal. The click signal is provided to a graphical control unit 230, and is used to control a directional movement of the graphics object 130 in the x-y plane or to focus a specific graphics object 130. When the trackballs rotates, the detecting unit 220 generates a rotation signal. The rotation signal is provided to a graphics object control unit 230, and is used to rotate one or more graphics objects around a specific-axis to focus a plurality of graphics objects successively or to perform a zoom function.

When at least two of the trackballs successively rotate for a certain time, the detecting unit 220 detects the rotational speeds of the trackballs. The rotational speeds of the trackballs are determined from the difference between the time when the first trackball rotation is stopped and the time when the next trackball starts to rotate. If the second trackball 212 rotates in the X-axis direction after the first trackball 211 rotates in the x-axis direction, the detecting unit 220 determines the difference between a time when the first rotating trackball 211 is stopped and time when the next trackball 212 starts to rotate. The detecting unit 220 inputs the results to the graphics object control unit 230.

A storage unit 240 stores a mapping table needed to navigate a three-dimensional graphical user interface according to the signal provided by the inputs unit 210 and detecting unit 220. The mapping table defines the relationship between a combination of the input signals provided by the input unit 210 and the detecting unit 220 and the command for the navigation, which will be described in detail with reference to FIGS. 4A and 4B.

FIGS. 4A and 4B illustrate several exemplary embodiments of a mapping table.

Referring to FIG. 4A, the mapping table 410 maps a command for moving a position of the graphics object 130 in a direction corresponding to a position of each trackball according to a click signal of each trackball. For example, a command for moving a position of the graphics object 130 in a positive x-axis direction is mapped in a click signal of the second trackball 212. Also, a command for rotating the graphics object 130 around a specific-axis is mapped for a combination of two or more rotation signals. If the first trackball 211 and the second trackball 212 respectively rotate from left to right in turn, the graphics object 130 is rotates around y-axis in a counterclockwise direction. If the first trackball 211 rotates upward, the third trackball 213 rotates in a right direction, and then, the second trackball 212 rotates downward, the graphics object 130 rotates in a clockwise direction. For a combination of two or more rotation signals, other graphics objects may rotate around one graphics object.

Referring to FIG. 4B, the mapping table 420 maps a command for focusing the graphics object 130 which includes a direction corresponding to each click signal. For example, a command for focusing the graphics object 130 at a positive x-axis direction is mapped in a click signal of the second trackball 212. Also, a command for successively focusing a plurality of graphics objects on a specific-axis is mapped for a combination of two or more rotation signals. If the first trackball 211 and the second trackball 212 respectively rotate from left to right in turn, the plurality of graphics objects arranged on the x-axis are successively focused. If the first trackball 211 rotates upward, the third trackball 213 rotates in a right direction, and then the second trackball 212 rotates downward, a command for enlarging a size of a specific graphics object (i.e., a zoom-in command) is mapped. If the second trackball 212 rotates upward, the third trackball 213 rotates in a left direction, and then the first trackball 211 rotates downward, a command for reducing a size of a specific graphics object (i.e., a zoom-out command) is mapped.

The storage unit 240 stores at least one of the mapping tables. The storage unit 240 may be, but is not limited to, at least one of a nonvolatile memory device such as a cache, read-only memory (ROM), programmable ROM (PROM), erasable PROM (EPROM), electrically erasable PROM (EEPROM), or a flash memory, a volatile memory device such as random access memory (RAM), or a storage medium such as hard disk drive (HDD).

A graphics object control unit 230 performs navigation according to an input signal with reference to the mapping table. Navigation means focusing a specific graphics object 130 and controlling a motion of the graphics object. The motion of the graphics object 130 may include a position movement of the graphics object 130, a rotation of the graphics object 130, and a size enlargement or a reduction of the graphics object 130.

If a click signal is provided by the detecting unit 220, the graphics object control unit 230 moves the graphics object 130 in a direction corresponding to the click signal. The movement of the graphics object 130 will be described with reference to FIGS. 5A and 5B.

As another exemplary embodiment, if the click signal is provided, the graphics object control unit 230 may focus a specific graphics object located in a direction corresponding to the click signal, of a plurality of graphics objects. The method of focusing the graphics object 130 will be described with reference to FIGS. 8A through 8C.

If a plurality of rotation signals are provided by the detecting unit 220, the graphics object control unit 230 performs navigation corresponding to a result of combining each rotation signal with reference to mapping tables 410 and 420.

The graphics object control unit 230 rotates a specific object 130 around a specific-axis according to the result of combining a plurality of rotation signals. When the plurality of graphics objects exist, the graphics object control unit 230 may rotate all the plurality of graphics objects, except the graphics object 130, around the graphics object 130. The method of rotating the graphics object 130 according to a combination of rotation signals will be described with reference to FIGS. 6A through 7C.

As another exemplary embodiment, the graphics object control unit 230 may successively focus a plurality of graphics objects according to a result of combining a plurality of rotation signals. If at least two of the trackballs rotates in a same direction, e.g., an x-axis direction, the graphics object control unit 230 successively focuses a plurality of graphics objects at the x-axis. Here, the graphics object control unit 230 may include increasing focusing step according to a trackball rotational speed. Increasing focusing means that more graphics objects are successively focused on, as the trackball rotational speed is increased, when a focus is moved between several graphics objects.

For more detailed description, a first through tenth graphics objects are arranged on the x-axis and the first graphics object is focused, which will be described as an example. If the first trackball 211 and the second trackball 212 rotate in a positive x-axis direction in turn, when the trackball rotational speed is 3 units, the third graphics object is focused. When the trackball rotational speed is 7 units, the seventh graphics object is focused.

If the last-input rotation signal is re-input within a certain time, the focusing may be successively performed according to the re-input rotation signal. In the above example, if the second trackball re-rotates in a positive direction of the x-axis within a certain time, e.g., 2 sec, after the seventh graphics object is focused according to the rotating speed of the first and second trackballs, the graphics object control unit 230 focuses a graphics object arranged in the positive x-axis direction around the seventh graphics object, e.g., an eighth graphics object. The method of focusing a graphics object according to a combination of rotation signals will be described with reference to FIGS. 8A through 8C.

The display unit 250 displays a result processed by the graphics object control unit 230. The display unit 250 may be, but is not limited to, an image display device such as a liquid crystal display (LCD), light-emitting diode (LED), organic light-emitting diode (OLED), or plasma display panel (PDP).

A movement of a graphics object according to an exemplary embodiment of the present invention will be described with reference to FIGS. 5A and 5B.

When the trackballs 211, 212, 213, and 214 are clicked, the detecting unit 220 generates a click signal, and provides it to the graphics object control unit 230. The graphics object control unit 230 moves the graphics object in a direction corresponding to the click signal with reference to the mapping tables 410 and 420.

Figure 5A:
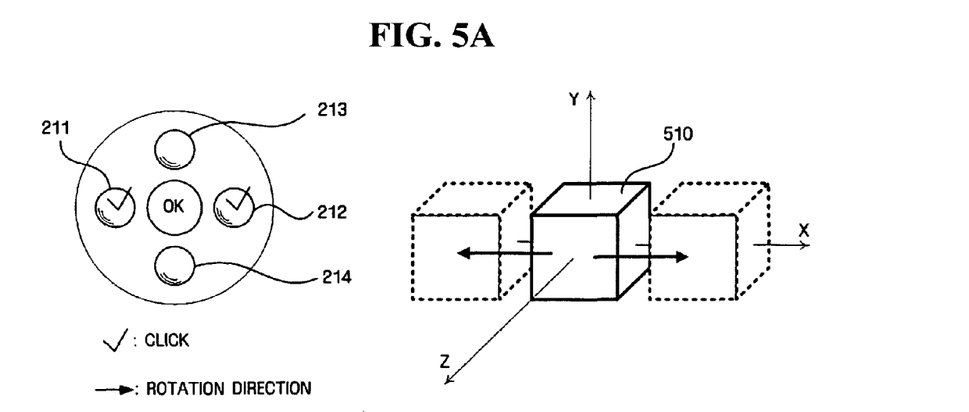
FIGS. 5A and 5B illustrate a movement of a graphics object according to an exemplary embodiment of the present invention.

If the mapping table 410 is the same as FIG. 4A and the first or second trackball is clicked as illustrated in FIG. 5A, the graphics object control unit 230 moves a graphics object 510 in a negative or positive x-axis direction for a certain interval. If the third or fourth trackball is clicked as illustrated in FIG. 5B, the graphics object control unit 230 moves the graphics object 510 in a negative or positive direction of the y-axis for a certain interval.

The rotating of a graphics object according to an exemplary embodiment of the present invention will be described with reference to FIGS. 6A through 6C.

If at least two of the trackballs rotate, the detecting unit 220 the detecting unit 220 generates a rotation signal for each track ball, and provides it to the graphics object control unit 230. The graphics object control unit 230 rotates the graphics object around a specific-axis according to a combination of each rotation signal.

Figure 6A:
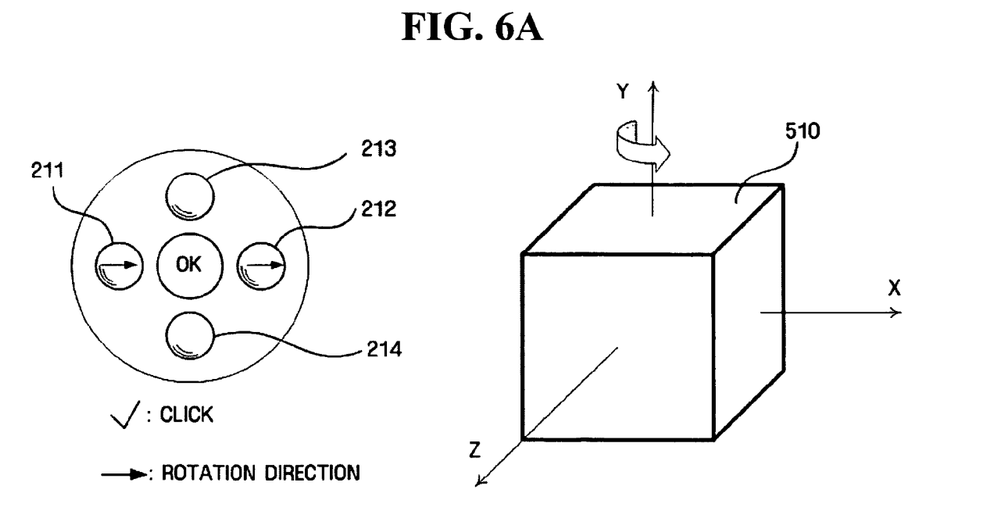
FIGS. 6A through 6C illustrate a rotating of a graphics object according to an exemplary embodiment of the present invention.

If the mapping table 410 is the same as FIG. 4A and the first and second trackballs 211 and 212 respectively rotate from left to right in turn as illustrated in FIG. 6A, the graphics object control unit 230 rotates a graphics object 510 around the y-axis in a counterclockwise direction. If the second and first trackball respectively rotate from right to left in turn, the graphics object control unit 230 rotates the graphics object 510 around the y-axis in a clockwise direction.

Figure 6B:
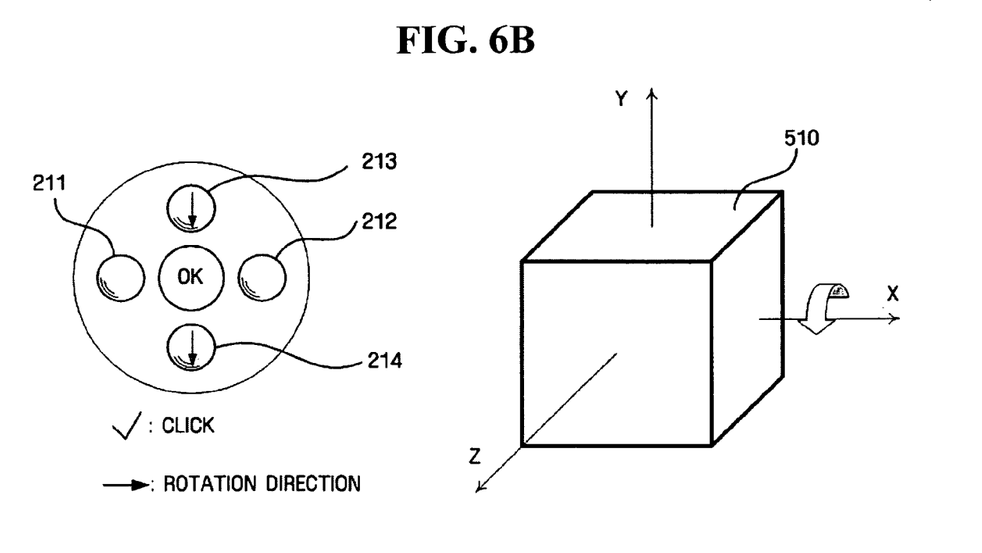

As another example, if the third and fourth trackballs 213 and 214 respectively rotate downward in turn as illustrated in FIG. 6B, the graphics object control unit 230 rotates a graphics object 510 around the x-axis in a counterclockwise direction. If the fourth and third trackballs respectively rotate upward in turn, the graphics object control unit 230 rotates the graphics object 510 around the x-axis in clockwise direction.

Figure 6C:
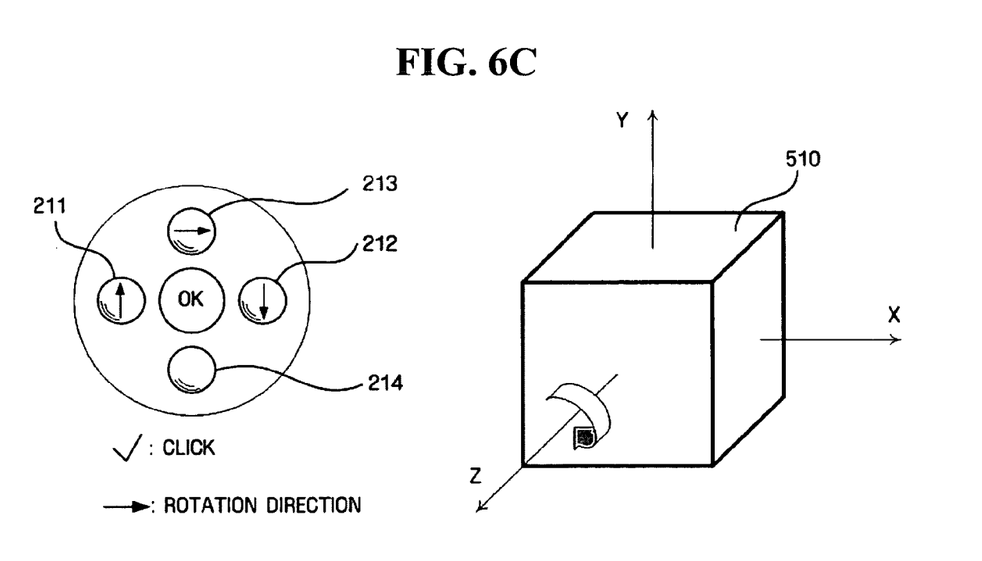

As further another example, as illustrated in FIG. 6C, if the first trackball 211 rotates upward, the third trackball 213 rotates in a right direction, and then the second trackball 212 rotates downward, the graphics object control unit 230 rotates a graphics object 510 around a z-axis in a clockwise direction. If the second trackball 212 rotates upward, the third trackball 213 rotates in a left direction, and then the second trackball 212 rotates downward, the graphics object control unit 230 rotates a graphics object 510 around the z-axis in a counterclockwise direction.

Figure 7A:
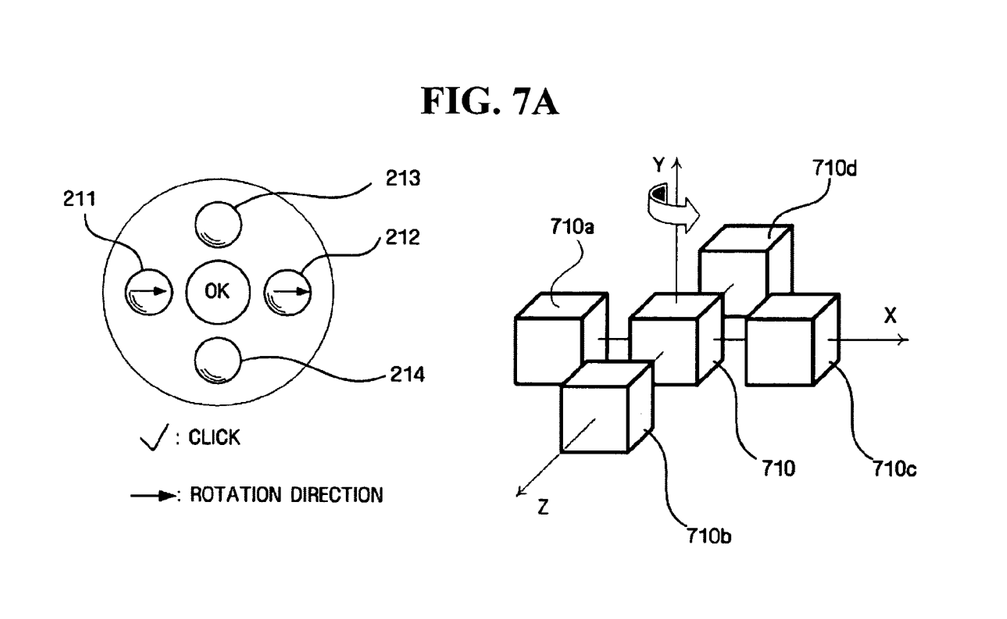
FIGS. 7A through 7C illustrate a rotating of a graphics object according to another exemplary embodiment of the present invention.
Figure 7B:
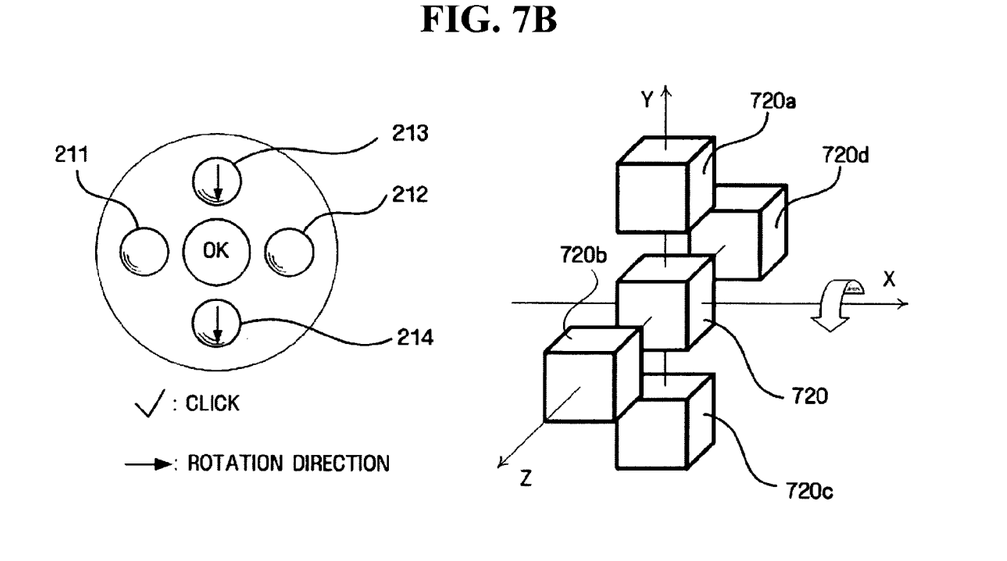
Figure 7C:
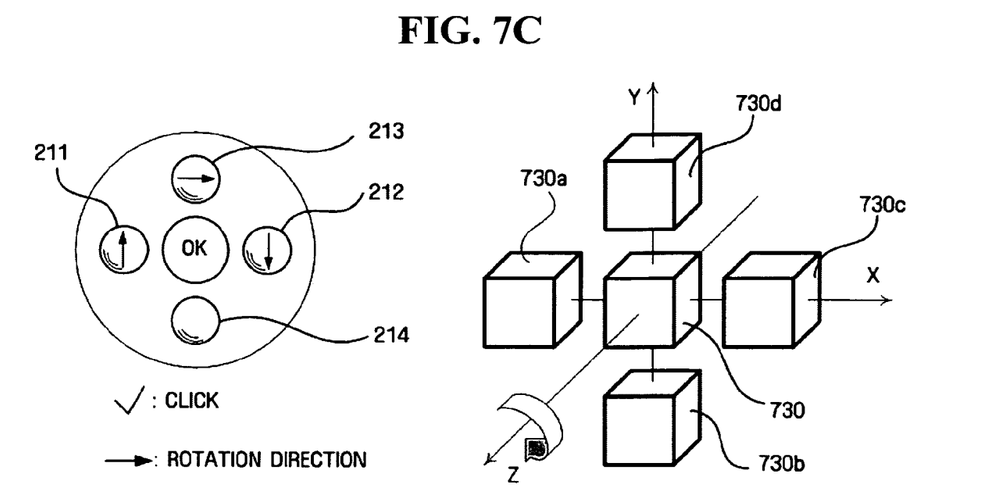

As described above, the graphics object control unit 230 may rotate a single graphics object around a specific-axis according to a combination of two or more rotation signals. When a plurality of graphics objects exist, all, except a specific graphics object, may rotate around the specific graphics object. FIGS. 7A through 7C illustrate a case of rotating all but a specific graphics object around the specific graphics object according to a combination of two or more rotation signals.

If the first and second trackballs 211 and 212 respectively rotate from left to right in turn as illustrated in FIG. 7A, the graphics object control unit 230 rotates graphics objects 710a, 710b, 710c, and 710d except for a graphics object 710 located in center, around the y-axis in a counterclockwise direction. If the second and first trackball respectively rotate from right to left in turn, the graphics object control unit 230 rotates other graphics objects 710a, 710b, 710c, and 710d except for a graphics object 710 located in center, around the y-axis in clockwise direction.

As another example, if the third and fourth trackballs 213 and 214 respectively rotate downward in turn as illustrated in FIG. 7B, the graphics object control unit 230 rotates graphics objects 720a, 720b, 720c, and 720d except for a graphics object 720 located in center, around the x-axis in a counterclockwise direction. If the fourth and third trackballs respectively rotate upward in turn, the graphics object control unit 230 rotates graphics objects 720a, 720b, 720c, and 720d except for a graphics object 720 located in center, around the x-axis in a clockwise direction.

As further another example, as illustrated in FIG. 7C, if the first trackball 211 rotates upward, the third trackball 213 rotates in a right direction, and then the second trackball 212 rotates downward, the graphics object control unit 230 rotates graphics objects 730a, 730b, 730c, and 730d except for a graphics object 730 located in center, around a z-axis in a clockwise direction. If the second trackball 212 rotates upward, the third trackball 213 rotates in a left direction, and then the second trackball 212 rotates downward, the graphics object control unit 230 rotates graphics objects 730a, 730b, 730c, and 730d except for a graphics object 730 located in center, around on a z-axis in a counterclockwise direction.

A focusing process of a graphics object according to another exemplary embodiment of the present invention will be described with reference to FIGS. 8A through 8C.

When the trackballs 211, 212, 213, and 214 are clicked, the detecting unit 220 generates a click signal, and provides it to the graphics object control unit 230. The graphics object control unit 230 focuses the graphics object located in a direction corresponding to the click signal with reference to the mapping table.

Figure 8A:
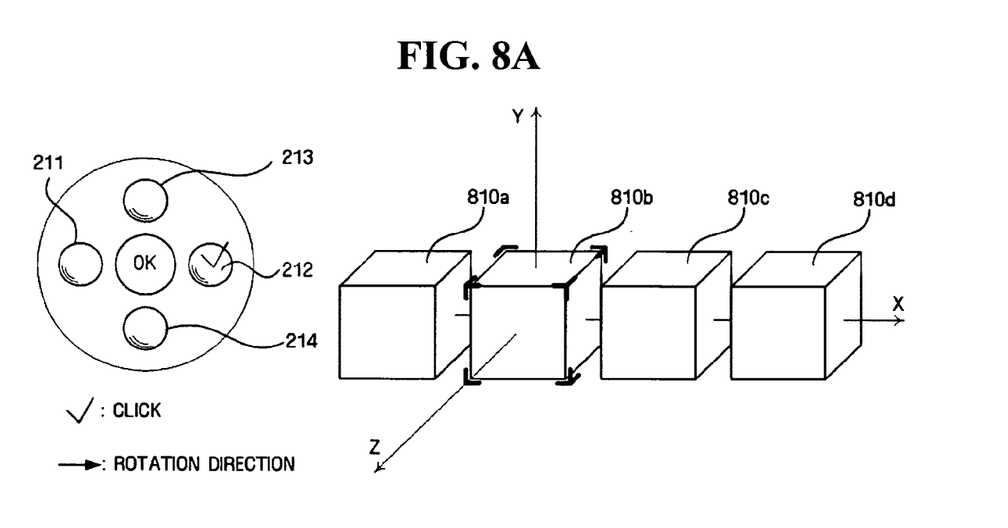
FIGS. 8A through 8C illustrate a focusing process of a graphics object according to another exemplary embodiment of the present invention.

If the first, second, third, and fourth graphics objects (810a, 810b, 810c, and 810d) are arranged on the x-axis, and the first graphics object 810a is focused when the second trackball 212 is clicked, as illustrated in FIG. 8A, the graphics object control unit 230 focuses the second graphics object 810b.

When the plurality of trackballs 211, 212, 213, and 214 rotate, the detecting unit 220 generates a rotation signal corresponding to each trackball, and provides it to the graphics object control unit 230. The graphics object control unit 230 successively focuses graphics objects in a specific direction, i.e., a direction corresponding to a combination of the plurality of trackballs movement, of the plurality of graphics objects.

Figure 8B:
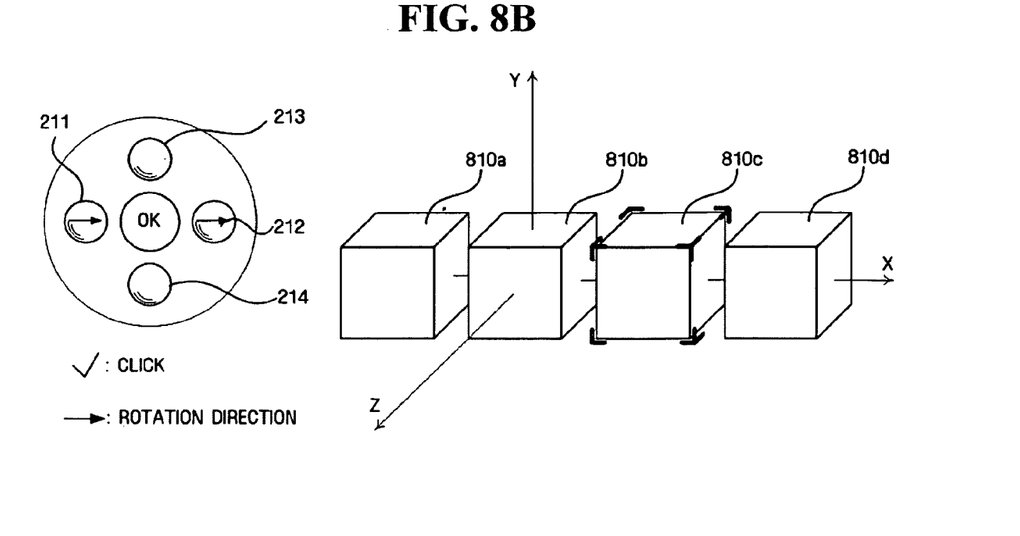
Figure 8C:
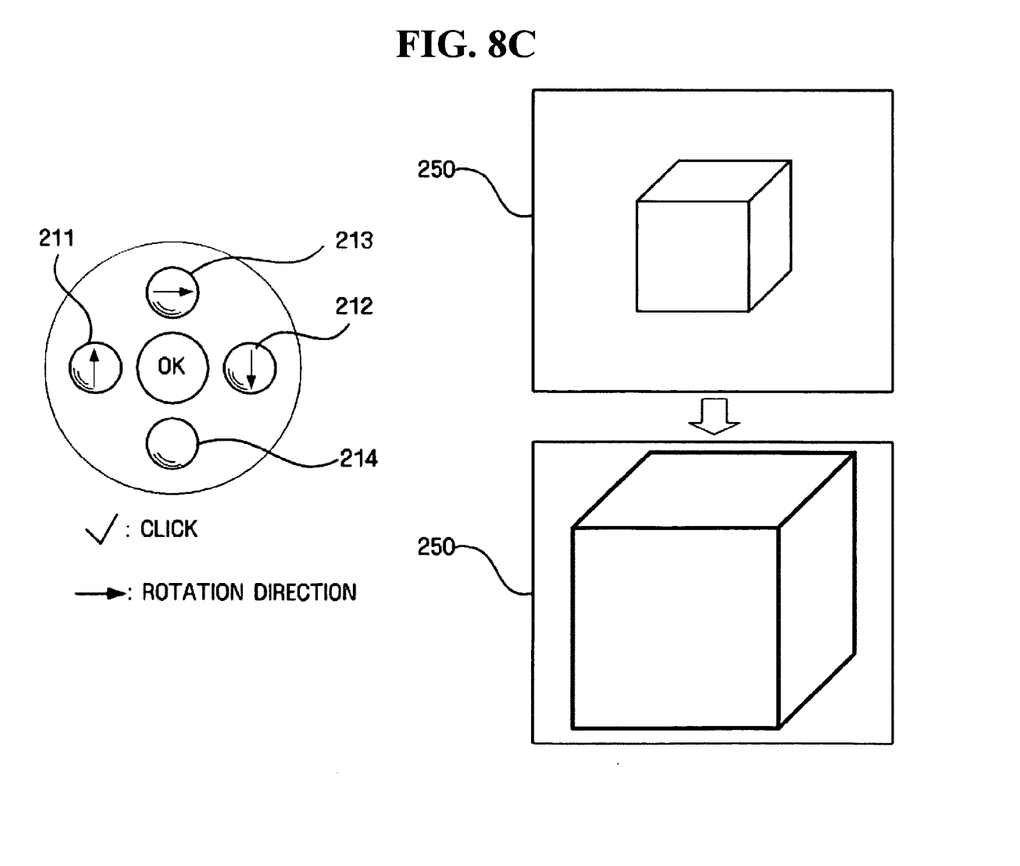

If the first, second, third, and fourth graphics objects (810a, 810b, 810c, and 810d) are arranged on the x-axis, and the first graphics object 810a is focused, when the first and second trackballs 211 and 212 rotate from left to right in turn as illustrated in FIG. 8B, the graphics object control unit 230 successively focuses from the first graphics object 810A and other graphics objects arranged in +x-axis direction. The last-focused graphics object is different according to a rotating speed of the first and second trackballs 211 and 212. If the rotating speed of the first and second trackballs is 3 units, the third graphics object 810c may be focused last. If the rotating speed of the first and second trackballs is 4, the fourth graphics object 810d may be focused last.

If the last-input rotation signal is re-input within a certain time, the graphics object control unit 230 performs successively the focusing according to the re-input rotation signal. In the above example, if the second trackball is rotated again in a positive direction of the x-axis within a certain time, e.g., 2 sec, after the third graphics object 810c is focused according to the speed of the first and second trackballs, the graphics object control unit 230 focuses a graphics object arranged in the positive direction of the x-axis around the third graphics object 810c, e.g., a fourth graphics object 810d. A plurality of graphics objects within a same category are successively focused by a combination of the rotation signals generated by a plurality of trackballs rotated in the same direction, which was described, as in the example. However, according to another exemplary embodiment, a plurality of graphics objects including a plurality of sub-graphical-object may be successively focused by a combination of the rotation signals.

If two or more trackballs rotate in a clockwise or counterclockwise direction, the graphics object control unit 230 performs a zoom-in or a zoom-out in the z-axis. If the first trackball 211 is rotated upward, the third trackball 213 is rotated in a right direction, and then the second trackball 212 rotates downward as illustrated in FIG. 8C, the graphics object 230 performs the zoom-in. If the second trackball 212 is rotated upward, the third trackball 213 rotates in a left direction, and then the first trackball 211 is rotated downward, the graphics object 230 performs the zoom-out.

Figure 9:
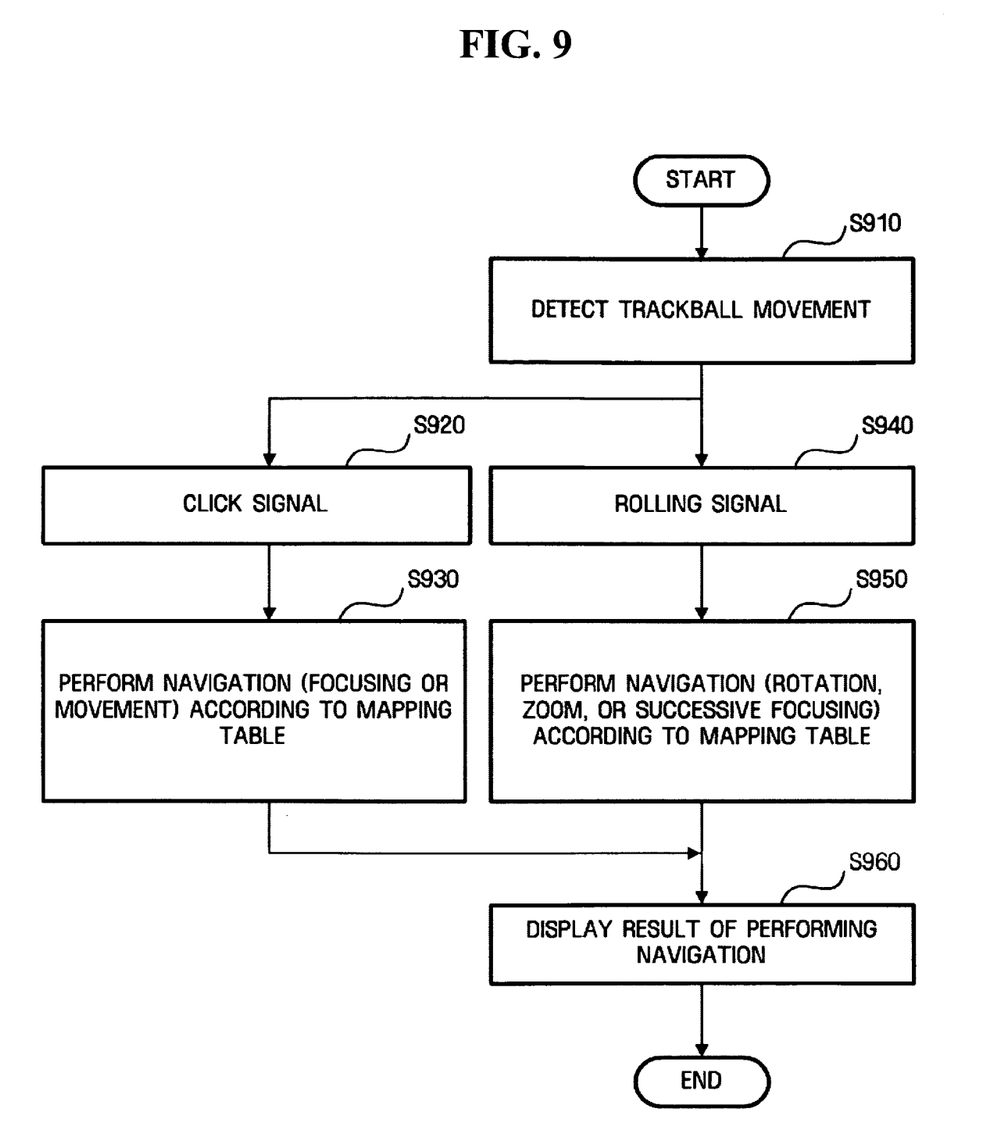
FIG. 9 is a flowchart illustrating an operation of navigation according to another exemplary embodiment of the present invention.

FIG. 9 is a flowchart illustrating an operation of navigation according to another exemplary embodiment of the present invention.

The detecting unit 220 detects a click and rotating of trackballs (S910). The detecting unit 220 generates click and rotation signals, and provides them to the graphics object control unit 230.

If the click signal is provided S920, the graphics object control unit 230 performs navigation corresponding to the input click signal with reference to the mapping table stored in the storage unit 240 (S930).

Figure 5B:
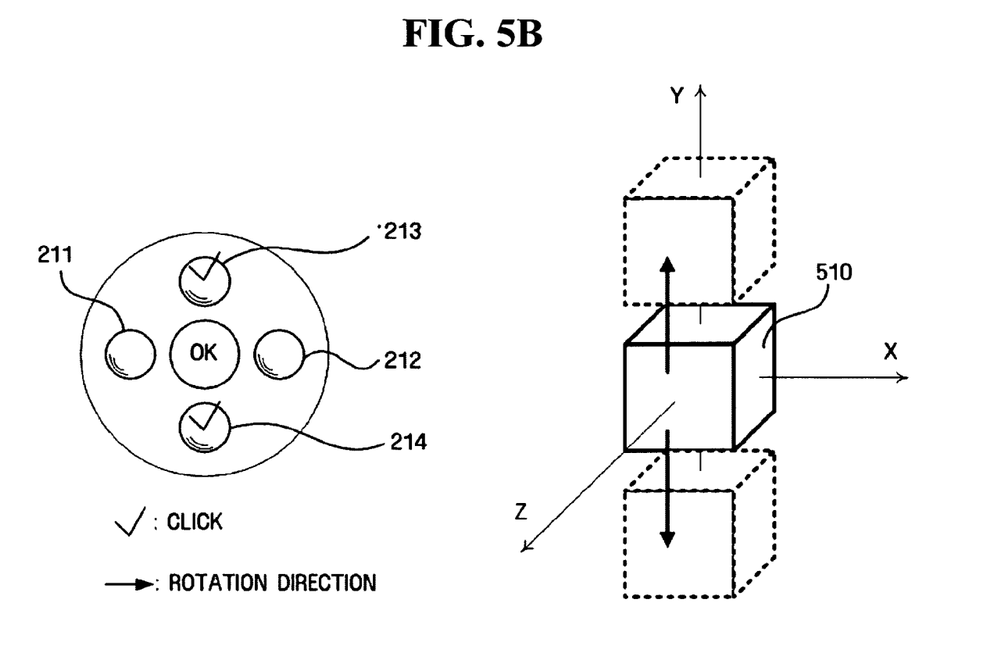

As illustrated in FIGS. 5A and 5B, the graphics object control unit 230 moves a graphics object in a direction corresponding to the click signal. Or the graphics object control unit 230 focuses graphics object in a direction corresponding to the click signal as illustrated in FIG. 8A.

If a plurality of rotation signals are successively provided (S940), the graphics object control unit 230 performs navigation from a combination of rotation signals with reference to the mapping table (S950). As illustrated in FIGS. 6A through 6C, the graphics object control unit 230 rotates a graphics object around a specific-axis according to the combination of rotation signals. As another example, the graphics object control unit 230 successively focuses a graphics object in a specific direction of several graphics objects as illustrated in FIG. 8B, or performs a zoom-in or a zoom-out as illustrated in FIG. 8C.

As described above, when navigation is performed by the graphics object control unit 230, the performing result is displayed via the display unit 250 (S960).

As described above, the navigation apparatus and method using the three-dimensional graphical user interface according to the present invention produces one or more of the effects described below.

First, since an input unit corresponding to x-axis, y-axis, and z-axis directions is provided, easy navigation in the x-y plane and a z-axis is possible.

Second, it is possible to prevent a problem that may occur when a user navigates a three-dimensional graphical user interface using a two-dimensional input unit.

Third, it is possible to develop various three-dimensional graphical user interfaces.

Fourth, a fast input is possible by trackball rotating.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A navigation apparatus for a three-dimensional graphical user interface, the apparatus comprising:
    an input unit that comprises a plurality of trackballs, each trackball being clickable and rotatable in two dimensional directions, in a space containing a certain plane and an-axis crossing the plane at a right angle, for navigation in a direction of the plane and the-axis;
    a detecting unit that detects a combination of the plurality of trackball movements and generates a plurality of input signals;
    a mapping table that defines the relationship between a combination of the plurality of input signals and a command for the navigation; and
    a graphics object control unit that performs the navigation corresponding to the combination of the plurality of input signals,
    wherein the plurality of trackballs comprises four trackballs wherein the mapping table maps a combination of a first input signal and a second input signal to a single command for navigation, the first input signal corresponding to a movement of a first trackball, of the plurality of trackballs, and the second input signal corresponding to a movement of a second trackball, of the plurality of trackballs.

2. The apparatus of claim 1, wherein the trackballs are arranged as a cross at a position corresponding to a navigation direction for each of the trackballs in the plane.

3. The apparatus of claim 1, wherein the movement refers to a click and a rotation.

4. The apparatus of claim 1, wherein the input signal comprises a click signal for the plurality of trackballs and a rotation signal corresponding to a certain direction.

5. The apparatus of claim 4, wherein the mapping table comprises information on combining at least two rotation signals.

6. The apparatus of claim 4, wherein the graphics object control unit moves a graphics object existing in the space according to the click signal.

7. The apparatus of claim 4, wherein, if a plurality of graphics objects exists in the space, the graphics object control unit focuses a graphics object in a direction corresponding to the click signal of the plurality of graphics objects.

8. The apparatus of claim 4, wherein, if at least two of the trackballs rotate in the same direction, the graphics object control unit rotates the graphics object in a direction corresponding to the direction of rotation of the trackballs.

9. The apparatus of claim 4, wherein, if at least two of the trackballs rotate in the same direction and a plurality of graphics objects are in the space, the graphics object control unit rotates all the plurality of graphics objects, except a selected graphics object around the selected graphics object, in a direction corresponding to the direction of rotation of the trackballs.

10. The apparatus of claim 4, wherein, if at least two of the trackballs rotate in the same direction, the graphics object control unit successively focuses a plurality of graphics objects arranged on a position corresponding to the direction of rotation of the trackballs.

11. The apparatus of claim 4, wherein the graphics object control unit rotates the graphics object in a direction corresponding to the combination of rotation signals according to a combination of rotation signals generated when at least two of the trackballs rotate in different directions.

12. The apparatus of claim 4, if a plurality of graphics objects are in the space, wherein the graphics object control unit rotates all the plurality of graphics objects, except a selected graphics object, around the selected graphics object in a direction corresponding to the combination of rotation signals according to a combination of rotation signals generated when at least two of the trackballs rotate in different directions.

13. The apparatus of claim 4, wherein, if a combination of rotation signals generated when at least two of the trackballs rotate is clockwise, the graphics object control unit enlarges a size of the graphics object.

14. The apparatus of claim 4, wherein, if a combination of rotation signals generated when at least two of the trackballs rotate is counterclockwise, the graphics object control unit reduces a size of the graphics object.

15. The apparatus of claim 1 wherein the detecting unit comprises a plurality of sub-detecting units, wherein there is a one-to-one relationship between the sub-detecting units and the trackballs.

16. The apparatus of claim 1, further comprising a display unit that displays a result of navigation performed by the graphics object control unit.

17. A navigation method for a three-dimensional graphical user interface, the method comprising:
receiving a plurality of input signals, from a plurality of trackballs, in a space containing a certain plane and an-axis crossing the plane at a right angle, for navigation in a direction of the plane and the-axis; and
performing the navigation corresponding to a combination of the plurality of input signals which refers to a mapping table that defines the relationship between the combination of the plurality of input signals and a command for the navigation, wherein the plurality of input signals are generated according to a combination of the plurality of trackball movements, each trackball being clickable and rotatable in two dimensional directions, wherein the plurality of trackballs comprises four trackballs wherein the mapping table maps a combination of a first input signal and a second input signal to a single command for navigation, the first input signal corresponding to a movement of a first trackball, of the plurality of trackballs, and the second input signal corresponding to a movement of a second trackball, of the plurality of trackballs.

18. The method of claim 17, wherein the input signal comprises a click signal and a rotation signal corresponding to a certain direction.

19. The method of claim 18, wherein the mapping table comprises information on combining at least two rotation signals.

20. The method of claim 18, wherein the performing of navigation comprises moving a graphics object existing in the space according to the click signal.

21. The method of claim 18, wherein the performing of navigation comprises focusing a graphics object in a direction corresponding to the click signal of the plurality of graphics objects.

22. The method of claim 18, wherein the performing of navigation comprises, if at least two of the trackballs rotate in the same direction, rotating the graphics object in a direction corresponding to the direction of rotation of the trackballs.

23. The method of claim 18, wherein, if a plurality of graphics objects exist in the space in the same plane with the plurality of graphics objects around the graphics object located in the center, the performing of navigation comprises, if at least two of the trackballs rotate in the same direction, rotating all the plurality of graphics object around the graphics object in the center, except the graphics object located in the center, in a direction corresponding to the direction of rotation of the trackballs.

24. The method of claim 18, wherein the performing of navigation comprises, if at least two of the trackballs rotate in the same direction, successively focusing a plurality of graphics objects arranged in a position corresponding to the direction of rotation of the trackballs.

25. The method of claim 18, wherein the performing of navigation comprises, rotating the graphics object in a direction corresponding to the combination of rotation signals according to a combination of rotation signals generated when at least two of the trackballs rotate in different directions.

26. The method of claim 18, wherein, if a plurality of graphics objects exist in the space in the same plane with the plurality of graphics objects around the graphics object located in the center, the performing of navigation comprises rotating all the plurality of graphics object around the graphics object in the center, except the graphics object located in the center, in a direction corresponding to the combination of rotation signals according to a combination of rotation signals generated when at least two of the trackballs rotate in different directions.

27. The method of claim 18, wherein the performing of navigation comprises, if a combination of rotation signals generated when at least two of the trackballs rotate is clockwise, enlarging a size of the graphics object.

28. The method of claim 18, wherein the performing of navigation comprises, if a combination of rotation signals generated when at least two of the trackballs rotate is counterclockwise, reducing a size of the graphics object.

29. The method of claim 17 further comprising displaying the result of performing the navigation.

* * * * *